United States Patent Office 3,325,119
Patented June 13, 1967

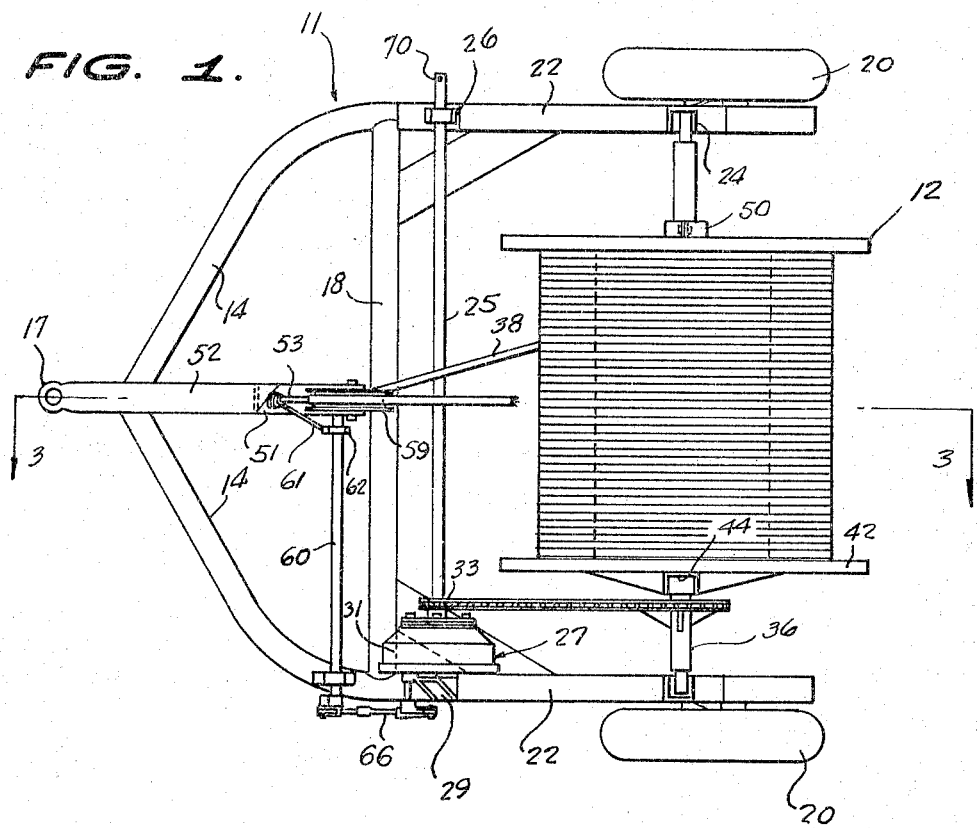
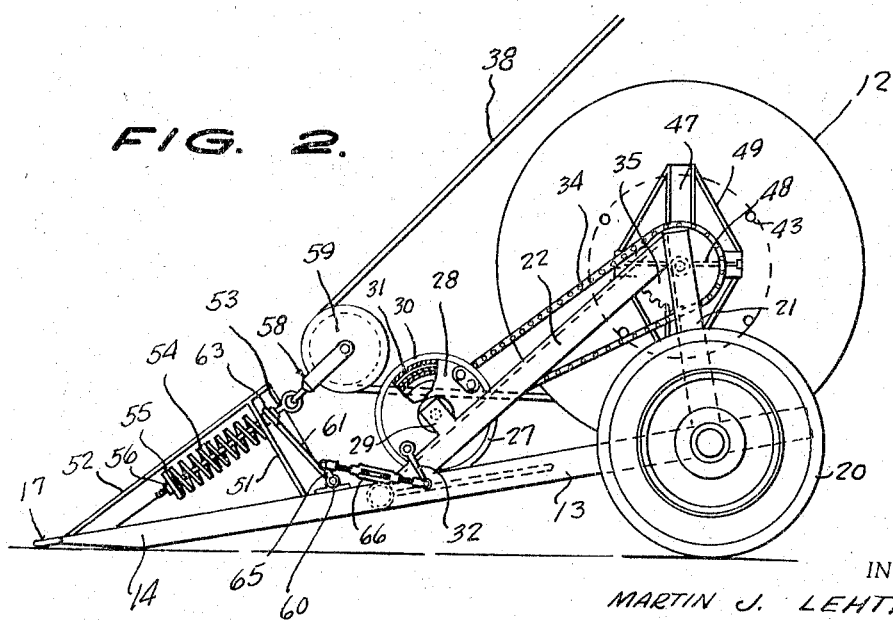

3,325,119
REEL CARRIER AND WIRE TENSIONING
TRAILER
Martin J. Lehtio, 129 N. 2nd St., Buckroe Beach,
Hampton, Va. 23364
Filed Aug. 13, 1965, Ser. No. 479,366
9 Claims. (Cl. 242—86.7)

This invention relates to trailers, and more particularly to a trailer for carrying a reel of wire and for dispensing wire therefrom during the installation of the wire.

A main object of the invention is to provide a novel and improved trailer adapted to be used for transporting reels carrying cable or the like, such as electrical transmission cable, telephone transmission cable, and the like, the trailer being simple in construction, being easy to manipulate, and enabling reels of wire to be readily loaded thereon or unloaded therefrom without requiring the use of a crane.

A further object of the invention is to provide an improved trailer for transporting reels of wire, the trailer being provided with tension-regulating means so as to enable cable or wire to be dispensed from a reel carried on the trailer at any desired tension while being pulled therefrom, thus insuring dependable control of the cable or wire at all times, whereby to minimize hazards involved in the installation of the wire, for example, above existing energized high voltage conductors.

A still further object of the invention is to provide an improved trailer for transporting reels of wire, the trailer being inexpensive to fabricate, being durable in construction, being relatively light in weight, being arranged to serve as a tension-regulating means as the cable or wire is being unwound from a reel carried on the trailer, and also being adapted to be employed in conjunction with suitable power means as a pulling winch or power reel.

Further objects and advantages of the invention will become apparent from the following description and claims, and from the accompanying drawings, wherein:

FIGURE 1 is a top plan view of an improved cable reel trailer constructed in accordance with the present invention, shown with a reel of electrical cable mounted thereon.

FIGURE 2 is a side elevational view of the trailer and cable reel shown in FIGURE 1.

Figure 3:
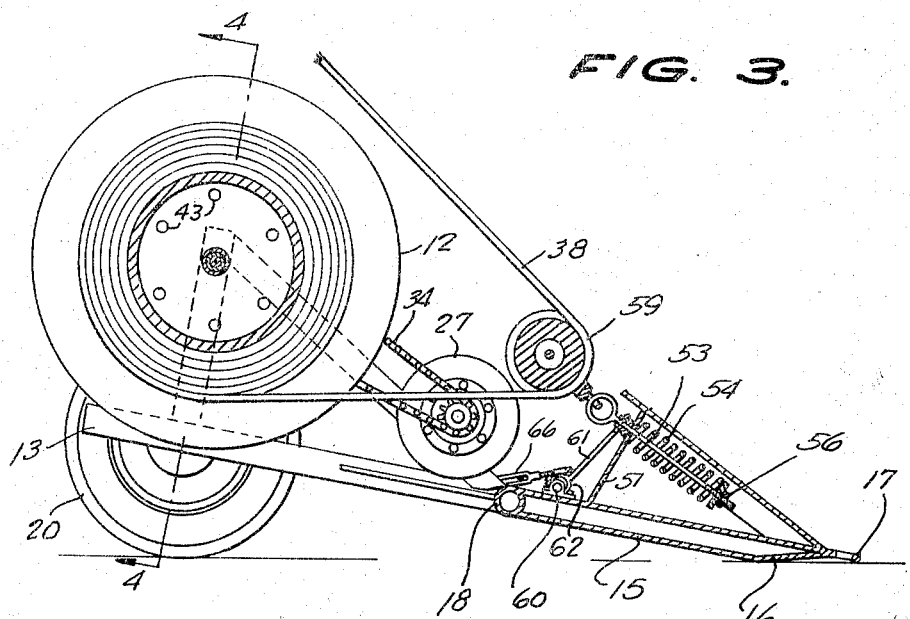
FIGURE 3 is a longitudinal vertical cross sectional view taken substantially on the line 3—3 of FIGURE 1.

Referring to the drawings, 11 generally designates an improved cable reel-transporting trailer constructed in accordance with the present invention, the trailer being illustrated with a conventional cable reel 12 mounted thereon and with the cable in the process of being unwound from the reel.

The trailer 11 comprises a main frame consisting of tubular side bars or arms 13, 13 having convergent forward portions 14, 14 which are joined rigidly to a longitudinally extending tongue or hitch bar 15 the tongue bar being located on the longitudinal center line of the frame and projecting a short distance forwardly from the connections of the convergent side bar portions 14, 14 therewith, as shown at 16. The forwardly projecting portion 16 tapers in height and terminates in an anchor ring 17 which may be employed for securing the trailer to a suitable anchor post or stake driven into the ground or secured to the subjacent supporting surface on which the trailer is positioned. A tubular cross bar 18 rigidly connects the side bars 13, 13, the rear end of the central tongue bar 15 being rigidly connected to the mid portion of cross bar 18. Rigidly secured to the rear end portions of the side bars 13, 13 are outwardly projecting stub axle assemblies 19, 19 on which are journaled respective rubber tired wheels 20, 20.

Mounted on the longitudinally extending rear portions of the side bars 13, 13 are respective upstanding post members 21, said post members being preferably rigidly secured to the rear ends of the side bars adjacent to the outwardly extending axle assemblies 19. Rigidly connecting the top ends of the post members 21 with the forward portions of the side bars 13 are respective inclined strut bars 22, 22, whereby the post members 21 and the strut bars 22 define substantially triangular frames with respect to their associated side bars 13.

Figure 5:
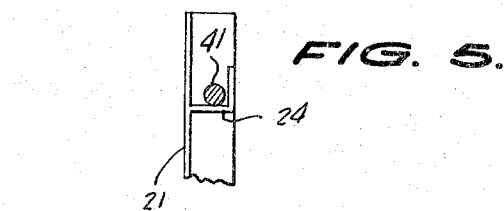
FIGURE 5 is an enlarged fragmentary vertical cross sectional view taken substantially on the line 5—5 of FIGURE 4.

The post members 21 are preferably of right angled cross sectional shape, and rigidly secured in the upper portions thereof are respective right angled bracket members 24, 24, arranged in the manner illustrated in FIGURE 5 so as to define supporting trunnions or seats for the opposite ends of a reel-supporting shaft, as will be presently described.

Designated at 25 is a countershaft which is journaled substantially transversely on the frame 11 rearwardly adjacent to the cross bar 18, one end portion of the countershaft 25 being rotatably supported in a bearing assembly 26 mounted on one side arm 22 and the other end portion being journaled in the casing of a brake assembly 27 whose stationary face plate 28 is secured to an upstanding bracket 29 provided on the strut bar 22 on the side bar 13 opposite the strut bar 22 carrying the bearing assembly 26.

The brake assembly 27 is provided with the internal brake shoes 30, said brake shoes being movable into braking engagement with rotary portions of the assembly, said rotary portions being connected to the shaft 25. Thus, the drum portion 31 of the assembly 27 may be directly connected to shaft 25 and the shoes 30 may be engageable with the interior surface of said drum portion. A brake actuating arm 32 forms part of the brake assembly 27, which is of generally conventional construction, the arm 32 acting to move the shoes 30 into engagement with the drum 31 responsive to clockwise rotation of said arm, as viewed in FIGURE 2, whereby to apply braking force which retards the rotation of countershaft 25.

Mounted on the countershaft 25 adjacent the brake assembly 27 is a small sprocket wheel 33. The sprocket wheel 33 is drivingly connected by a chain 34 to a large sprocket wheel 35 mounted on the cable reel supporting shaft 36, so that the rate of rotation of the shaft 36 is positively controlled by countershaft 25. As will be presently explained, the rate of rotation of shaft 36 is automatically controlled in accordance with the desired amount of tension in the associated unwinding electrical cable or wire 38.

Shaft 36 comprises a main sleeve portion 39 in which is secured an inner sleeve 40, in which is in turn secured a shaft rod 41 which projects from the opposite ends of the inner sleeve 40, the ends of the shaft rod 41 being rotatably receivable in the trunnions or supporting seats defined by the angle bracket elements and the angle bars 21, above described. The outer sleeve 39 is freely engageable through the central apertures provided on the side flanges 42, 42 of a conventional cable reel. Said side flanges 42 are likewise provided with circularly arranged locking apertures 43, for example, six evenly spaced locking apertures.

Figure 4:
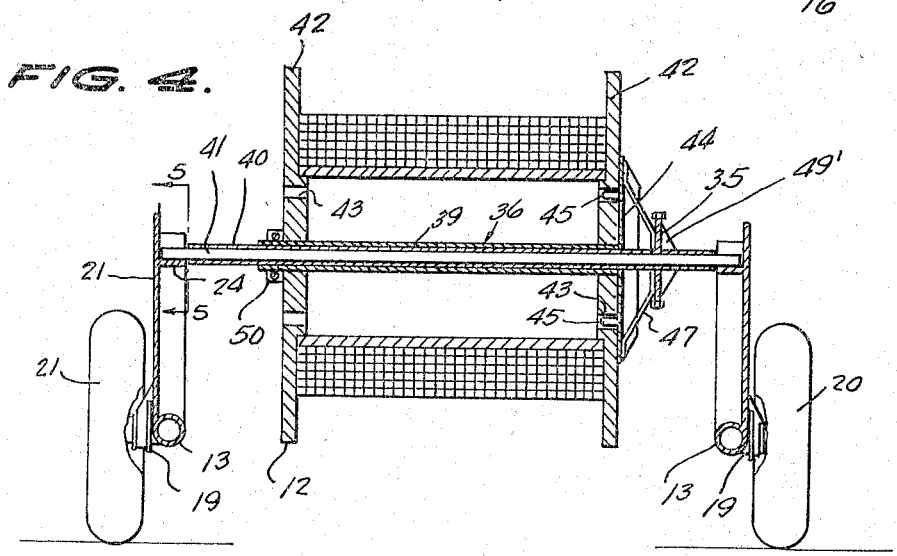
FIGURE 4 is a cross sectional view taken substantially on the line 4—4 of FIGURE 3.

The sleeve member 40 extends through and is rigidly secured to the mid portion of a transversely extending channel bar 44 and also extends through and is rigidly secured to the mid portion of a bridging bar 47 of bowed shape whose respective ends are rigidly secured to the ends of the web of channel bar 44, as shown in FIGURE 4. Opposing outwardly projecting strut bars 48 are rigidly secured to the opposite sides of the mid portion of channel bar 44 and the ends of the strut bars are connected to the ends of the channel bar 44 by tie rods 49. The large sprocket wheel 35 is rigidly secured to the mid portion of the bowed bar 47, and is thus rigidly braced to the channel bar 44. Sprocket wheel 35 is provided with radial triangular bracing gussets 49' which cooperate with the bar 47 to rigidly hold the sprocket wheel 35 perpendicular to the axis of the shaft assembly 36.

The channel bar 44 is provided adjacent its opposite ends with inwardly projecting pin elements 45, 45 which are engageable in the locking apertures 43 of the adjacent reel flange 42 in the manner illustrated in FIGURE 4. A collar 50 is secured on the opposite end portion of the outer sleeve member 39 to hold the reel 12 in a position wherein the pins 45, 45 remain in the locking apertures 43 so as to retain reel 12 in driving coupling relationship with the shaft assembly 36.

Rigidly secured on the rear portion of the longitudinal center bar 15 is an upstanding angle bar 51, and rigidly connecting the top end of bar 51 with the forward end portion of bar 15 is an inclined strut bar 52. An eye bolt 53 extends slidably through the flange of angle bar 51, and a coiled spring 54 surrounds the shank of the eye bolt forwardly of the flange of angle bar 51, bearing between said flange and a washer 55 provided on the end of the eye bolt 53 and retained thereon by a nut 56. Connected to the eye of bolt 53 is a pulley assembly 58 including a peripherally grooved pulley 59. The wire or cable 38 from the reel 12 is adapted to be engaged around the pulley 59 in the manner illustrated in FIGURE 2 to control the tension of the cable as it is being dispensed from the reel.

A transverse shaft 60 is journaled on the rear portion of center bar 15 and one of the side bars 13, the inner end of the shaft 60 being connected by an arm 61 to the eye bolt 53. Thus, the lower end of arm 61 may be secured to a collar 62, which is in turn secured on the shaft 60, and the other end of the arm 61 may be provided with an eye portion 63 which surrounds the bolt 53 and is loosely retained between a pair of collars secured on the bolt so that arm 61 is pivotally connected to the bolt and longitudinal movement of said bolt will cause shaft 60 to be rotated. The outer end of shaft 60 is provided with an arm 65 which is connected to the end of arm 32 by a link rod assembly including a turnbuckle 66 which may be adjusted to vary the length of the connection link between arm 65 and arm 32. Also, the tension on spring 54 may be varied by adjusting the position of the nut 56. By the adjustments provided by the turnbuckle 66 and the nut 56, the tension in the unwinding cable 38 may be regulated over a wide range, since these adjustments determine the amount of retarding force applied to the countershaft 25 responsive to the movement of the pulley 59, as will be presently described.

In using the trailer 11, a reel 12 is mounted on a shaft assembly 36 and is secured thereon with the pins 45 in engagement with apertures 43 in one of the side flanges 42 of the reel by means of the collar 50, as above described, so that the reel and shaft assembly 36 are connected together as a unit. The forward end portion of the trailer is elevated so as to bring the trunnion elements 24 below the level of the opposite ends of the shaft rod 41, being engaged thereunder to receive said opposite ends, and thereafter the forward end of the trailer is lowered to thereby lift the reel 12 with the axle assembly 36 off the ground into the position shown in FIGURES 1 and 2. The trailer may then be transported to any desired location by connecting the anchor ring 17 to a truck or other pulling vehicle employed for this purpose. The trailer is then anchored at the location at which the cable 38 is to be unwound, the cable being attached to the end of a rope from a winch or other pulling implement. The tension in the cable 38 as it is being unwound is regulated by the action of the brake assembly 27, above described, namely, as the tension in the cable 38 decreases, the pulley 59 moves to the left, as viewed in FIGURE 2, causing the shaft 60 to rotate counterclockwise and thus causing the arm 32 to rotate clockwise, which moves the brake shoes 30 into braking engagement with the drum 31, retarding the rotation of the shaft 25 and thereby retarding the rotation of the reel 12. The retardation of rotation of the reel 12 causes more tension to be developed in the cable 38, which pulls the pulley 59 to the right, as viewed in FIGURE 2, causing the arm 32 to be rotated counterclockwise and reducing the braking force applied to the shaft 25. Therefore, the tension in cable 38 is stabilized at a predetermined value, dependent upon the adjusted pretension in the spring 54 provided by the nut 56 and the adjustment of the turnbuckle 66, as above described.

As will be readily apparent, the reel trailer 11 may be employed to dispense cable from a reel 12, in the manner above described, or alternatively, it may be employed as a pulling means to pull rope or cable by connecting the countershaft 25 to a suitable winch or other driving means. Thus, the end of the countershaft 25 is apertured, as shown at 70, or is otherwise suitably formed for connection to an appropriate driving means, for example, for connection by means of one or more universal joints to a suitable prime mover.

While a specific embodiment of an improved reel carrying trailer has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A reel carrying trailer comprising a frame having spaced longitudinal side arms and a hitch bar connected to the forward ends of said side arms, respective supporting wheels journaled to said side arms, upstanding supports on the rear portions of said side arms, respective transversely aligned seats on the top portions of said upstanding supports, a reel shaft having its opposite ends rotatably received in said seats, movable cable-receiving means mounted on the frame adjacent to the reel shaft for receiving a portion of the cable on a reel secured on said reel shaft, and means to retard rotation of said reel shaft responsive to movements of the cable-receiving means.

2. A reel carrying trailer comprising a frame having spaced longitudinal side arms and a hitch bar connected to the forward ends of said side arms, respective supporting wheels journaled to said side arms, upstanding supports on the rear portions of said side arms, respective transversely aligned seats on the top portions of said upstanding supports, a reel shaft having its opposite ends rotatably received in said seats, a countershaft journaled transversely on said side arms, means drivingly coupling said countershaft to said reel shaft, brake means acting between said frame and said countershaft to retard rotation of said reel shaft, an idler pulley movably mounted on the forward end of said frame for receiving therearound a portion of a cable on a reel secured on said reel shaft, whereby the pulley moves with changes in tension of the cable as it is being unwound, and means to vary the braking force of said brake means responsive to the movements of said pulley.

3. A reel carrying trailer comprising a frame having spaced longitudinal side arms and a hitch bar connected to the forward ends of said side arms, respective supporting wheels journaled to said side arms, upstanding supports on the rear portions of said side arms, respective transversely aligned seats on the top portions of said upstanding supports, a reel shaft having its opposite ends rotatably received in said seats, a countershaft journaled transversely on said side arms, means drivingly coupling said countershaft to said reel shaft, brake means acting between said frame and said countershaft to retard rotation of said reel shaft, said brake means being provided with a control arm to vary the degree of braking force thereof, an idler pulley located to receive therearound cable from a reel secured on said reel shaft, means yieldably connecting said pulley to said frame whereby the pulley is movable relative to the frame responsive to changes in tension in the cable, and means operatively connecting the pulley to said control arm to vary the braking force of said brake means responsive to the movements of said pulley.

4. A reel carrying trailer comprising a frame having spaced longitudinal side arms, a longitudinal hitch bar at the forward end of the frame, and convergent forward portions on said side arms rigidly connected to said longitudinal hitch bar, respective supporting wheels journaled to said side arms, upstanding supports on the rear portions of said side arms, respective transversely aligned seats on the top portions of said upstanding supports, a reel shaft having its opposite ends rotatably received in said seats, a countershaft journaled transversely on said side arms, means drivingly coupling said countershaft to said reel shaft, brake means acting between said frame and said countershaft to retard rotation of said reel shaft, said brake means being provided with a control arm to vary the degree of braking force thereof, an idler pulley located to receive therearound cable from a reel secured on said reel shaft, means yieldably connecting said pulley to said longitudinal hitch bar, whereby the pulley is movable relative to the frame responsive to changes in tension in the cable, and means operatively connecting the pulley to said control arm to vary the braking force of said brake means responsive to the movements of said pulley.

5. A reel carrying trailer comprising a frame having spaced longitudinal side arms, a longitudinal hitch bar at the forward end of the frame, and convergent forward portions on said side arms rigidly connected to said longitudinal hitch bar, respective supporting wheels journaled to said side arms, upstanding supports on the rear portions of said side arms, respective transversely aligned seats on the top portions of said upstanding supports, a reel shaft having its opposite ends rotatably received in said seats, a countershaft journaled transversely on said side arms, means drivingly coupling said countershaft to said reel shaft, brake means acting between said frame and said countershaft to retard rotation of said reel shaft, said brake means being provided with a control arm to vary the degree of braking force thereof, an upstanding post member on said hitch bar, an idler pulley located to receive therearound cable from a reel secured on said reel shaft, means yieldably connecting said pulley to said post member, whereby the pulley is movable relative to the post member responsive to changes in tension in the cable, and means operatively connecting the pulley to said control arm to vary the braking force of said brake means responsive to the movements of said pulley.

6. A reel carrying trailer comprising a frame having spaced longitudinally side arms, a longitudinal hitch bar at the forward end of the frame, and convergent forward portions on said side arms rigidly connected to said longitudinal hitch bar, respective supporting wheels journaled to said side arms, upstanding supports on the rear portions of said side arms, respective transversely aligned seats on the top portions of said upstanding supports, a reel shaft having its opposite ends rotatably received in said seats, a countershaft journaled transversely on said side arms, means drivingly coupling said countershaft to said reel shaft, brake means acting between said frame and said countershaft to retard rotation of said reel shaft, said brake means being provided with a control arm to vary the degree of braking force thereof, an upstanding post member on said hitch bar, an idler pulley located to receive therearound cable from a reel secured on said reel shaft, means yieldably connecting said pulley to said post member, whereby the pulley is movable relative to the post member responsive to changes in tension in the cable, and an operating linkage connected between said yieldable connecting means and said control arm to vary the braking force of said brake means responsive to the movements of said pulley.

7. The reel carrying trailer recited in claim 6, and wherein said operating linkage includes a connecting arm and means for varying the length of said connecting arm.

8. The reel carrying trailer recited in claim 6, wherein said yieldable connecting means comprises an eye bolt having an eye at its rear end, said eye bolt being slidably engaged through said post member, said pulley being connected to the eye of said eye bolt, an adjusting nut on the forward end of said eye bolt, and a coiled spring on the eye bolt bearing between the post member and said nut, whereby the tension of the spring may be varied by adjusting said nut.

9. The reel carrying trailer recited in claim 8, and wherein said operating linkage includes an intermediate connecting arm provided with turnbuckle means for varying the length of said connecting arm.

References Cited
UNITED STATES PATENTS

| | | | |
|---|---|---|---|
| 694,404 | 3/1902 | Moore | 242—86.7 |
| 2,780,419 | 2/1957 | Hall | 242—86.7 |
| 3,258,219 | 6/1966 | McLendon | 242—86.7 |

FRANK J. COHEN, *Primary Examiner.*

N. L. MINTZ, *Assistant Examiner.*